(12) United States Patent
     Scrivano (10) Patent No.: US 10,733,227 B2
(45) Date of Patent: Aug. 4, 2020

(54) CONTAINER IMAGE SIZE REDUCTION VIA RUNTIME ANALYSIS

(71) Applicant: Red Hat, Inc., Raleigh, NC (US)

(72) Inventor: Giuseppe Scrivano, Spezzano della Sila (IT)

(73) Assignee: Red Hat, Inc., Raleigh, NC (US)

( * ) Notice: Subject to any disclaimer, the term of this patent is extended or adjusted under 35 U.S.C. 154(b) by 311 days.

(21) Appl. No.: 15/714,673

(22) Filed: Sep. 25, 2017

(65) Prior Publication Data

US 2019/0095441 A1   Mar. 28, 2019

(51) Int. Cl.
*G06F 16/00* (2019.01)
*G06F 16/51* (2019.01)

(52) U.S. Cl.
CPC .................................. *G06F 16/51* (2019.01)

(58) Field of Classification Search
CPC ................. G06F 16/51; G06F 16/178; G06F 2009/45595; G06F 2009/4557; G06F 2009/45562
See application file for complete search history.

(56) References Cited

U.S. PATENT DOCUMENTS

| | | | |
|---|---|---|---|
| 9,348,819 B1 | 5/2016 | Emelyanov et al. | |
| 9,436,558 B1 | 9/2016 | Per et al. | |
| 9,672,078 B2 | 6/2017 | Kacin et al. | |
| 9,916,110 B2 * | 3/2018 | Walsh | G06F 3/0644 |
| 2015/0023612 A1 * | 1/2015 | Thakkar | H04N 21/2383 382/305 |
| 2016/0275287 A1 * | 9/2016 | Wiest | G06F 21/55 |
| 2017/0039675 A1 * | 2/2017 | Thakkar | G06T 1/00 |
| 2017/0242617 A1 * | 8/2017 | Walsh | G06F 3/0644 |
| 2017/0264684 A1 * | 9/2017 | Spillane | H04L 67/1095 |
| 2018/0157505 A1 * | 6/2018 | Kairali | G06F 11/0754 |

FOREIGN PATENT DOCUMENTS

WO   WO2007122221   11/2007

OTHER PUBLICATIONS

Jason Wilders, *Squashing Docker Images*, Aug. 19, 2014, http://jasonwilder.com/blog/2014/08/19/squashing-docker-images/.
Rafael Benevides, *Keep it Small: A Closer look at Docker Image Sizing*, Mar. 9, 2016, Director of Developer Experience at Red Hat, https://developers.redhat.com/blog/2016/03/09/more-about-docker-images-size/.
Ethan Jones, Support Engineer, Codeship, *Reducing Your Docker Image Size*, May 5, 2017, https://blog.codeship.com/reduce-docker-image-size/.
Chris Stump, *Docker Image Reduction Techniques and Tools*, Feb. 23, 2016, chrisstump.online/2016/02/23/docker-image-reduction-techniques/.

* cited by examiner

*Primary Examiner* — Cheryl Lewis
(74) *Attorney, Agent, or Firm* — Haynes and Boone, LLP (57) ABSTRACT

An example method of reducing a container image size includes tracing an execution of a process running in a container. The container is associated with a first container image storing a set of files. The method also includes marking, based on the tracing, a subset of files accessed by the process. The method further includes creating a second container image storing the marked set of files.

20 Claims, 6 Drawing Sheets

CONTAINER IMAGE SIZE REDUCTION VIA RUNTIME ANALYSIS

BACKGROUND

The present disclosure generally relates to computing devices, and more particularly to reducing the size of a container image.

A container provides a platform to separate an application from the infrastructure running the application. The platform may provide a mechanism to run an application securely isolated in the container. A container is a self-contained execution environment and may share the kernel of the host operating system with other containers. The lightweight nature of containers, which run without the extra load of a hypervisor, may result in better use of hardware. Additionally, multiple containers may run on a machine.

BRIEF SUMMARY

Methods, systems, and techniques for reducing the size of a container image are provided.

An example method of reducing a container image size includes tracing an execution of a process running in a container. The container is associated with a first container image storing a set of files. The method also includes marking, based on the tracing, a subset of files accessed by the process. The method further includes creating a second container image storing the marked set of files.

An example system for reducing a container image size includes a profiler that traces an execution of a process running in a container. The container is associated with a first container image storing a set of files. The profiler marks, based on the tracing, a subset of files accessed by the process. The system also includes a container image manager that creates a second container image storing the marked set of files.

An example machine-readable medium includes a plurality of machine-readable instructions that when executed by one or more processors is adapted to cause the one or more processors to perform a method including: tracing an execution of a process running in a container, the container being associated with a first container image storing a set of files; marking, based on the tracing, a subset of files accessed by the process; and creating a second container image storing the marked set of files.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A container is an isolated processing space that can exist on top of a virtual machine or on top of actual hardware. The container may be viewed as a lightweight virtual machine that is used to create environments and may share the operating system with the host machine, preserving resources. In an example, a container may offer software that creates virtual environments mimicking a full virtual machine. A container may also offer other useful benefits.

A container image is a snapshot of a container and may contain a large amount of data. As the size of a container image grows, so does the memory used to store the container image. Additionally, the retrieval of a large container image from a repository may be time consuming. A solution to the problem of storing a large container image may involve reducing the size of the container image so that it contains fewer files, and thus less memory for storage. In some examples, the files included in a container image that are not accessed by a process running in the container may be removed. For example, a new container image may be generated, where the new container image does not include one or more of those files that were not accessed by the process. The new container image may contain only those files that are used by the process.

An example method of reducing a container image size includes tracing an execution of a process running in a container. The container is associated with a first container image storing a set of files. The method also includes marking, based on the tracing, a subset of files accessed by the process. The method further includes creating a second container image storing the marked set of files.

The present disclosure provides techniques for reducing a container image size. Unless specifically stated otherwise, as apparent from the following discussion, it is appreciated that throughout the description, discussions utilizing terms such as "determining," "storing," "tracing," "receiving," "sending," "marking," "executing," "creating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
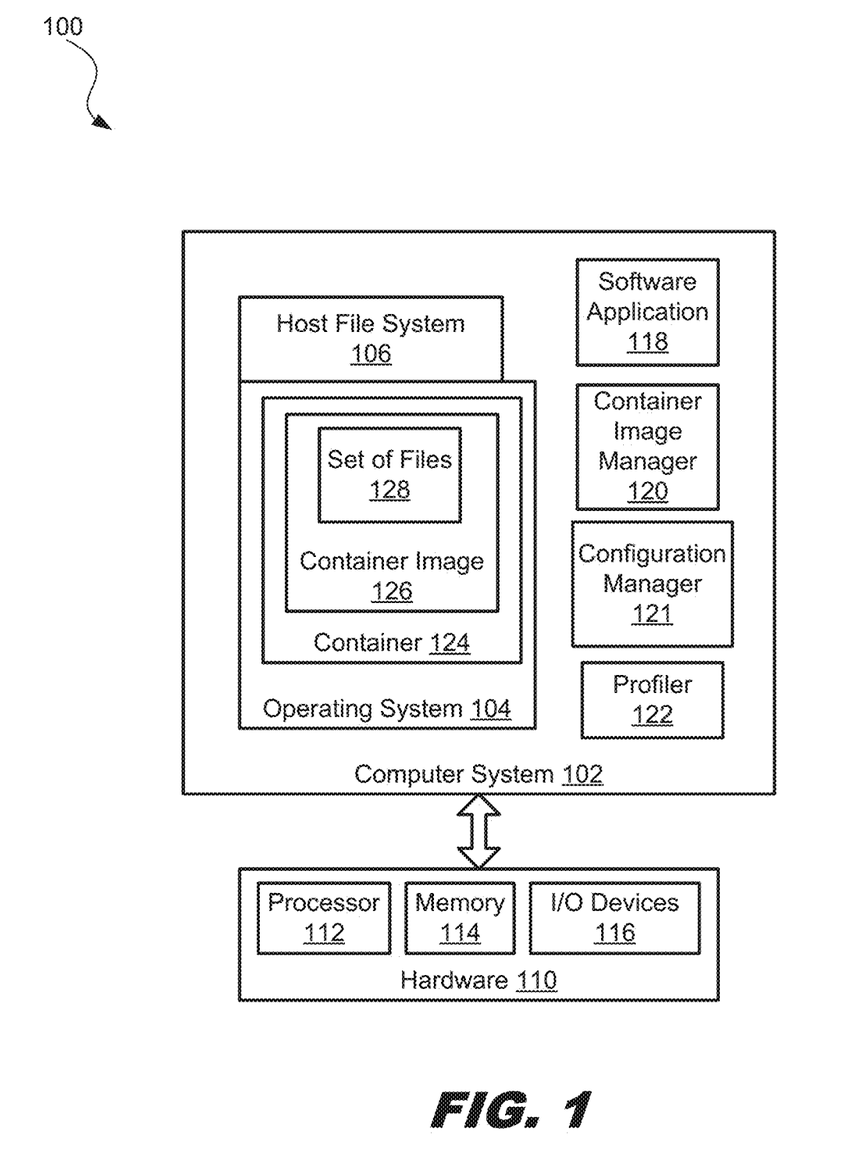
FIG. 1 is a diagram illustrating an example system for reducing the size of a container image.

FIG. 1 is a diagram illustrating an example system 100 for reducing the size of a container image. System 100 may deploy applications inside software containers. System 100 includes a computer system 102 that may be coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Computer system 102 is coupled to hardware 110 such as a processor 112 for executing software (e.g., machine-readable instructions) and using or updating data stored in memory 114. Hardware 110 may include one or more processors 112. A "processor" may also be referred to as a "central processing unit," "CPU" or "physical processor" herein. A processor shall refer to a device capable of executing instructions encoding arithmetic, logical, or input/output (I/O) operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 114 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system 104 and various other software applications 118. Hardware 110 may include other I/O devices 116.

Computer system 102 includes an operating system 104 that serves as a central component for facilitating communication between software application(s) 118 and hardware devices (e.g., processor 112, memory 114, and I/O devices 116) of a machine. Operating system 104 may be responsible for facilitating operating system functions and various management tasks (e.g., process management, disk management, and memory management). For example, operating system 104 manages, organizes, and keeps track of files stored on computer system 102. In an example, operating system 104 keeps track of where files are stored on the system, determines how the files are stored, links files to their owners, distinguishes between different file types (e.g., text files, binary files, and directory files), etc. In the example illustrated in FIG. 1, operating system 104 may manage files using a host file system 106. Host file system 106 may store one or more files, which may be structured as a collection of records or a sequence of bytes.

In an example, host file system 106 is a hierarchical file system. Operating system 104 may organize files into a hierarchical or more complex structure to reflect the relationships among the files, thus providing a comprehensive and easy-to-understand view of the files to the user. For example, a directory is a special type of file that has lists of files and their attributes. In an example, a first directory may store one or more files, where one of these files may be a second directory. Likewise, the second directory may store one or more files, which may or may not include a third directory. The first directory may be referred to as being at a "higher level" than the second directory. Conversely, the second directory may be referred to as being at a "lower level" or "deeper level" than the first directory.

Operating system 104 may load a container 124, which shares the same kernel of the host. Container 124 may include an entire runtime environment: an application, plus all its dependencies, libraries and other binaries, and configuration files needed to run it, bundled into one package. A container may run one or more applications on the local host (e.g., computer system 102), on physical or virtual machines in a data center, or in the cloud. Although computer system 102 is illustrated as including one container, it should be understood that computer system 102 may include more than one container.

In the example illustrated in FIG. 1, container 124 includes a container image 126 that may be a binary including the data for running the container, as well as metadata describing its needs and capabilities. In an example, container 124 only has access to resources defined in container image 126 unless container 124 is provided with additional access when it is created. Container image 126 may be deployed in multiple containers across multiple hosts and load balanced between them.

Figure 2:
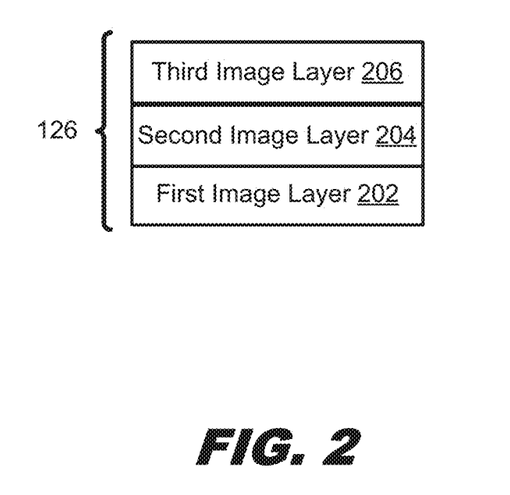
FIG. 2 is a diagram illustrating an example container image.

Container 124 may be self-contained and independent from the host, and may be used as a transport store that includes container image 126. In an example, container image 126 includes a tarball or zip file including a group of files that are bundled together. Additionally, container 124 may have "hooks" into the host. Container 124 may be, for example, a DOCKER® or an Open Container Initiative (OCI™) container. Container 124 includes a stack of one or more image layers and is associated with a container image 126 storing a set of files 128. FIG. 2 is a diagram illustrating an example container image 126. In FIG. 2, container image 126 includes a first image layer 202, a second image layer 204, and a third image layer 206. The image layers are stacked on top of each other, and each layer may be only a set of differences from the layer before it. Third image layer 206 is a top-level layer of the stack and is a read/write layer. Each image layer below the top-level layer is a read-only layer. In an example, a user may specify the top-level layer of the stack.

Referring back to FIG. 1, operating system 104 includes a container image manager 120, configuration manager 121, and profiler 122. Profiler 122 traces an execution of a process running in container 124. Profiler 122 may trace the execution by identifying one or more files opened by the process at runtime. When container 124 is launched, the container may run a single process, which may run an application.

In an example, set of files 128 includes one or more configuration files, and container 124 may be in the OCI runtime format. A configuration file may be a JavaScript Object Notation (JSON) file that is used to configure container 124. The configuration file may specify an initial configuration of container 124 and in particular specify the entry and mount points of the container along with an original process to execute inside container 124. In an example, configuration manager 121 modifies the initial entry point of container 124 and adds a new mount point from a path of the host, with one or more binary files. Profiler 122 may be implemented via the one or more binary files, which may launch the original process and trace the execution of the original process running inside container 124. In this example, the initial configuration of container 124 may be modified such that profiler 122 is a process that executes inside container 124, and profiler 122 becomes responsible for executing the original process (e.g., at least a portion of software application 118 or another program) and tracing the execution of the original process inside container 124. In an example, configuration manager 121 creates a new configuration file that changes the entry and mount points of container 124. The new mount point hosts the binary files for implementing profiler 122 and enables access to profiler 122 from container 124. Additionally, container 124 may be entered at the new mount point and the binary files accessed for analyzing and tracing the original process.

In another example, profiler 122 traces container 124's runtime process. In this example, the original process is traced from the host itself, without modifying the configuration of the container. Accordingly, it may be unnecessary to add the new mount point in order to trace the execution of the original process.

Profiler 122 marks, based on the tracing, a subset of files accessed by the original process. By marking the subset of files, profiler 122 may record all the files that are accessed (e.g., read or modified) at runtime inside container 124. An original process running in container 124 may be the main process, and one or more child processes may fork from the main process. Profiler 122 may trace an execution of one or more child processes of the main process and mark, based on the tracing, one or more files accessed by the one or more child processes.

Figure 3:
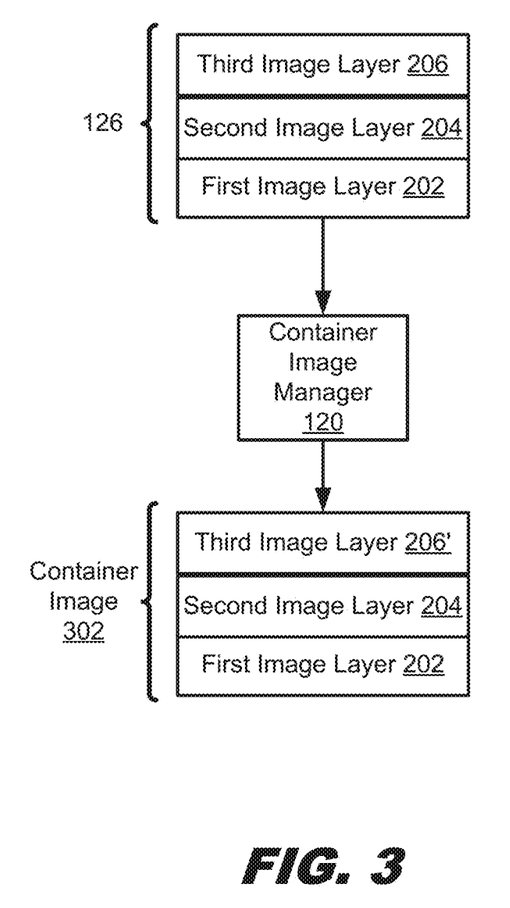
FIG. 3 is a diagram illustrating an example container image.

Container image manager 120 creates, based on container image 126 and the marked files, a container image storing the marked set of files. FIG. 3 is a diagram illustrating an example container image 302 storing the marked set of files. Second container image 302 is based on container image 126 and stores a subset of the files included in container image 126. In an example, the files marked by profiler 122 are marked for removal from container image 126, and second container image 302 may be used instead of container image 126 in the future. A size of container image 126 is larger than a size of second container image 302. In this way, the container image size reduction may be implemented by dynamic analysis of runtime of the container. In an example, second container image 302 is devoid of files that have not been marked by profiler 122. The first and second image layers of container image 126 and second container image 302 may be the same, respectively, and third image layer 206 may be different from third image layer 206'. In an example, third image layer 206' includes a subset of the files included in third image layer 206. For example, the files that are not included in third image layer 206' but are included in third image layer 206 may be the files marked by profiler 122.

It may be advantageous to modify second container image 302. An image layer may be used by one or more container images. It may be undesirable to remove a file from container image 126 if the file is from an image layer that is shared by more than one container image. For example, doing so may cause other container images that use the shared image layer to crash. A user may specify which image layers are shared and/or not shared by multiple container images. In an example, container image 126 includes a stack of one or more image layers, and profiler 122 traces the execution of the original process by identifying a first file that is accessed by the original process. In some examples, profiler 122 may determine whether the first file is from an image layer that is shared with at least two container images. In an example, profiler 122 marks the first file in response to a determination that the first file is not from an image layer that is shared with at least two container images. If the first file is from an image layer that is shared with at least two container images, profiler 122 may determine to not mark the first file. Alternatively, in a first round, profiler 122 may mark the subset of files that are accessed by the original process and in a second round, profiler 122 may traverse the marked files and unmark those files that are from an image layer that is shared with at least two container images.

It may be advantageous to take into consideration a file's location within the stack of image layers. The top-level layer is a read/write layer, and each image layer below the top-level layer is a read-only layer. It may be undesirable to mark a file for removal from an image layer that is a read-only image layer. A user may specify which image layers are read-only and/or not read-only. The top-level layer may be specified by the user as being the top-level layer of the stack. In some examples, profiler 122 may determine whether the first file is from a top-level layer of the stack. In an example, profiler 122 marks the first file in response to a determination that the first file is from the top-level layer of the stack. If the first file is from not from the top-level layer of the stack, profiler 122 may determine to not mark the first file. Alternatively, in a first round, profiler 122 may mark the subset of files that are accessed by the original process and in a second round, profiler 122 may traverse the marked files and unmark those that are not from the top-level layer of the stack.

It may be desirable to add a set of files to second container image 302, even if the set of files were not accessed by the original process at runtime. In an example, container image manager 120 has access to a whitelist specifying a list of files to add to second container image 302 and adds the list of files to second container image 302. At least one file specified in the whitelist is not accessed by the original process at runtime. One or more files in the whitelist may be specified by a user. The user may have knowledge regarding which files should be included in second container image 302. Container image manager 120 may create second container image 302 by creating the second container image storing the list of files specified in the whitelist.

It may be desirable to remove a set of files from second container image 302, even if the set of files were accessed by the original process at runtime. In an example, container image manager 120 has access to a blacklist specifying a list of files to remove from second container image 302 and removes the list of files from second container image 302. At least one file specified in the blacklist may have been accessed by the original process at runtime. One or more files in the blacklist may be specified by a user. The user may have knowledge regarding which files should not be included in second container image 302. Container image manager 120 may create second container image 302 by creating second container image 302 without the list of files specified in the blacklist.

Figure 4:
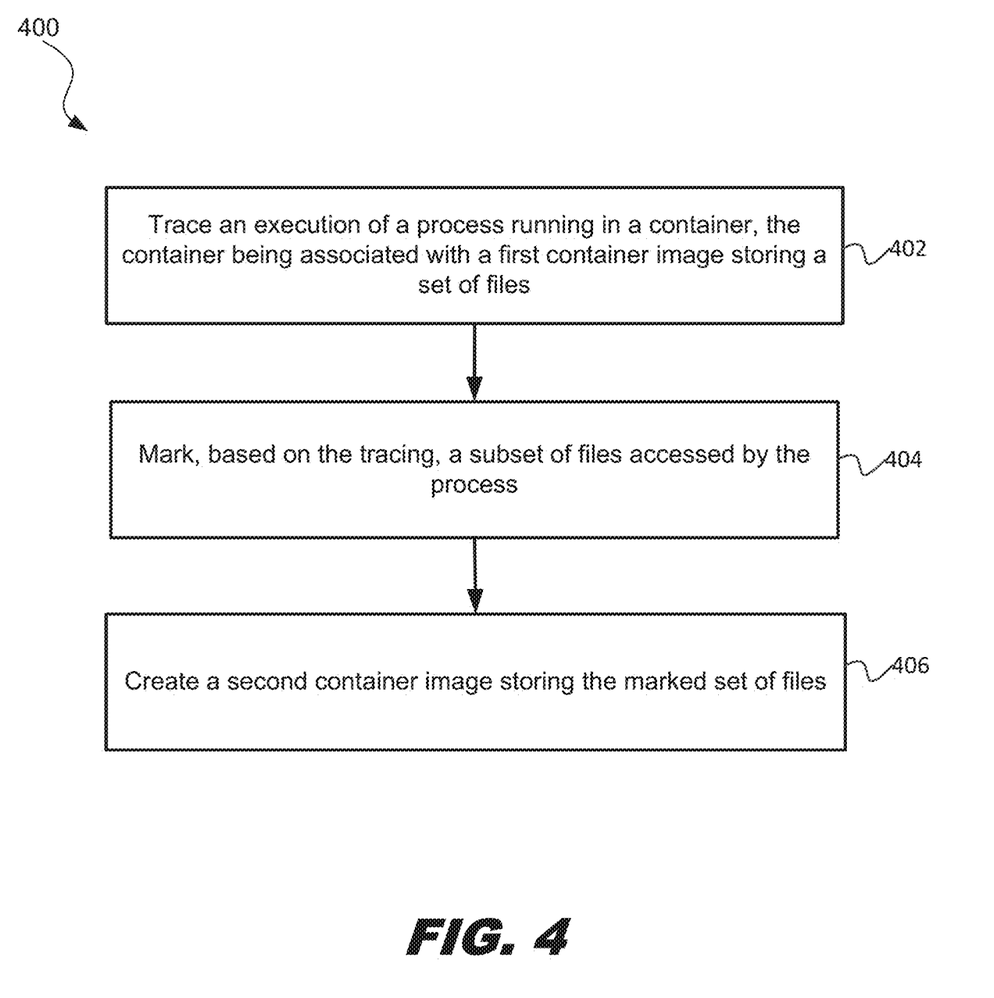
FIG. 4 is a flowchart illustrating an example method of reducing a container image.

FIG. 4 is a flowchart illustrating an example method 400 of reducing a container image. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 400 may be performed on system 100 illustrated in FIG. 1. The order of the actions described below may also be performed according to alternative orderings. In yet other examples, additional actions may be added and/or actions that are described may be removed.

Method 400 includes blocks 402, 404, and/or 406. In block 402, profiler 122 traces an execution of a process running in a container, the container being associated with a first container image storing a set of files. In block 404, profiler 122 marks, based on the tracing, a subset of files accessed by the process. In block 406, container image manager 120 creates a second container image storing the marked set of files. In an example, container image manager 120 creates the second container image by removing the files from the first container image. In another example, container image manager 120 creates the second container image by creating a new container image storing the marked files. It is understood that additional blocks may be performed before, during, or after blocks 402, 404, and/or 406 discussed above. As discussed above and further emphasized here, FIGS. 1-4 are merely examples, which should not unduly limit the scope of the claims.

In an example, profiler 122 and container image manager 120 may implement blocks 402, 404, and 406 for each of the image layers included in a container image. Additionally, second container image 302 may be included in a second container different from container 124. In an example, the second container may include each of the image layers included in container image 126 and only differ by the top-level layer of the stack.

Figure 5:
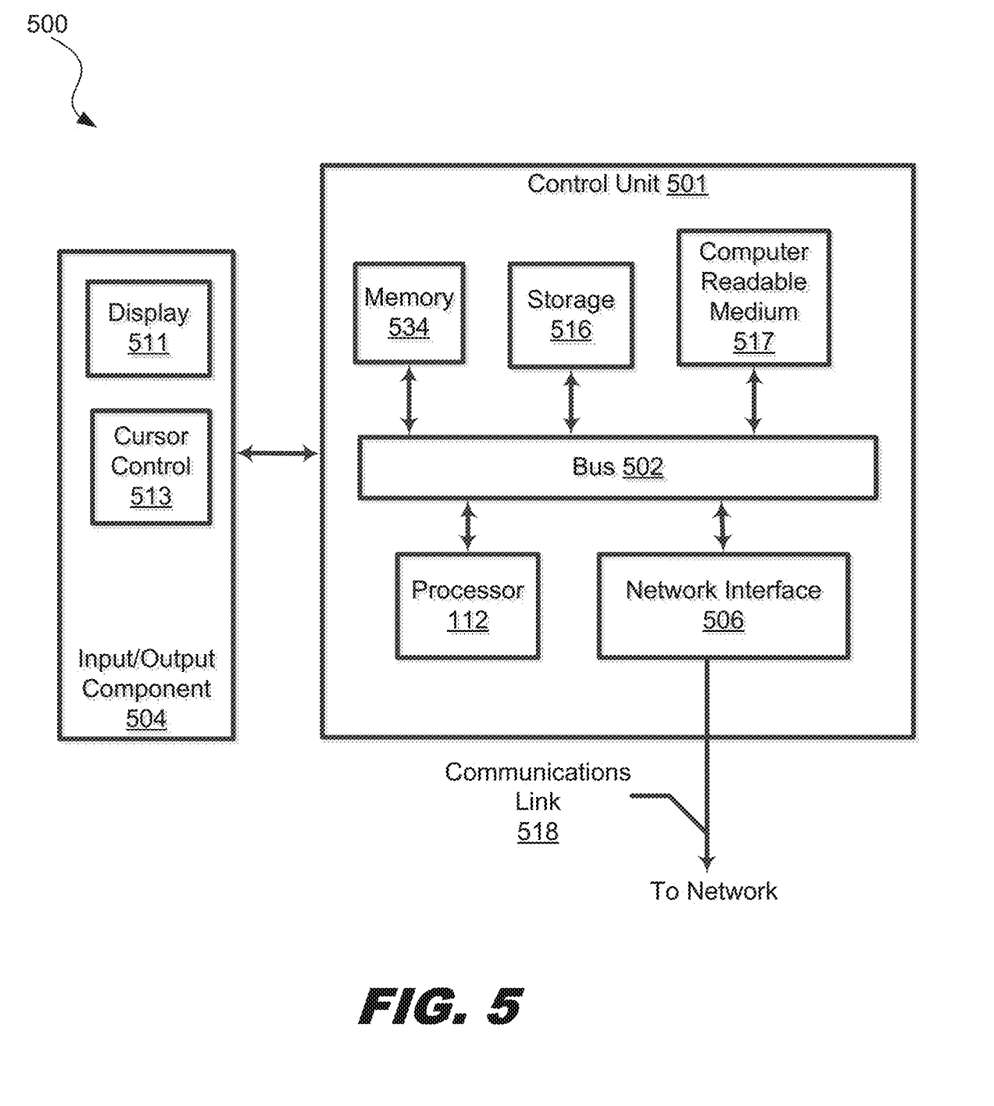
FIG. 5 is a block diagram of a computer system suitable for implementing one or more examples of the present disclosure.

FIG. 5 is a block diagram of a computer system 500 suitable for implementing one or more examples of the present disclosure. In various implementations, computer system 500 corresponds to computer system 102, which may include a client or a server computing device. The client or server computing device may include a plurality of processors. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an I/O component 504 that processes a user action, such as selecting keys from a keypad/keyboard or selecting one or more buttons or links, and sends a corresponding signal to bus 502. In an example, a user may request computer system 500 to load container 124 using I/O component 504. Additionally, the user may specify one or more files in the whitelist or blacklist using I/O component 504. I/O component 504 may also include an output component such as a display 511, and an input control such as a cursor control 513 (such as a keyboard, keypad, or mouse).

A transceiver or network interface 506 transmits and receives signals between computer system 500 and other devices via a communications link 518 to a network. In an example, the transmission is wireless, although other transmission mediums and methods may also be suitable. Processor 112, which may be a micro-controller, digital signal processor (DSP), or other processing component, processes these various signals, such as for display on computer system 500 or transmission to other devices via communications link 518. Processor 112 may also control transmission of information, such as cookies or IP addresses, to other devices.

Components of computer system 500 also include a system memory component 534 (e.g., RAM), a static storage component 516 (e.g., ROM), and/or a disk drive 517. Computer system 500 performs specific operations by processor 112 and other components by executing one or more sequences of instructions contained in system memory component 534. Logic may be encoded in a computer readable medium, which may refer to any medium that participates in providing instructions to processor 112 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 534, and transmission media includes coaxial cables, copper wire, and fiber optics, including wires that include bus 502. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method 400) to practice the present disclosure may be performed by computer system 500. In various other examples, a plurality of computer systems 500 coupled by communication links 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 6:
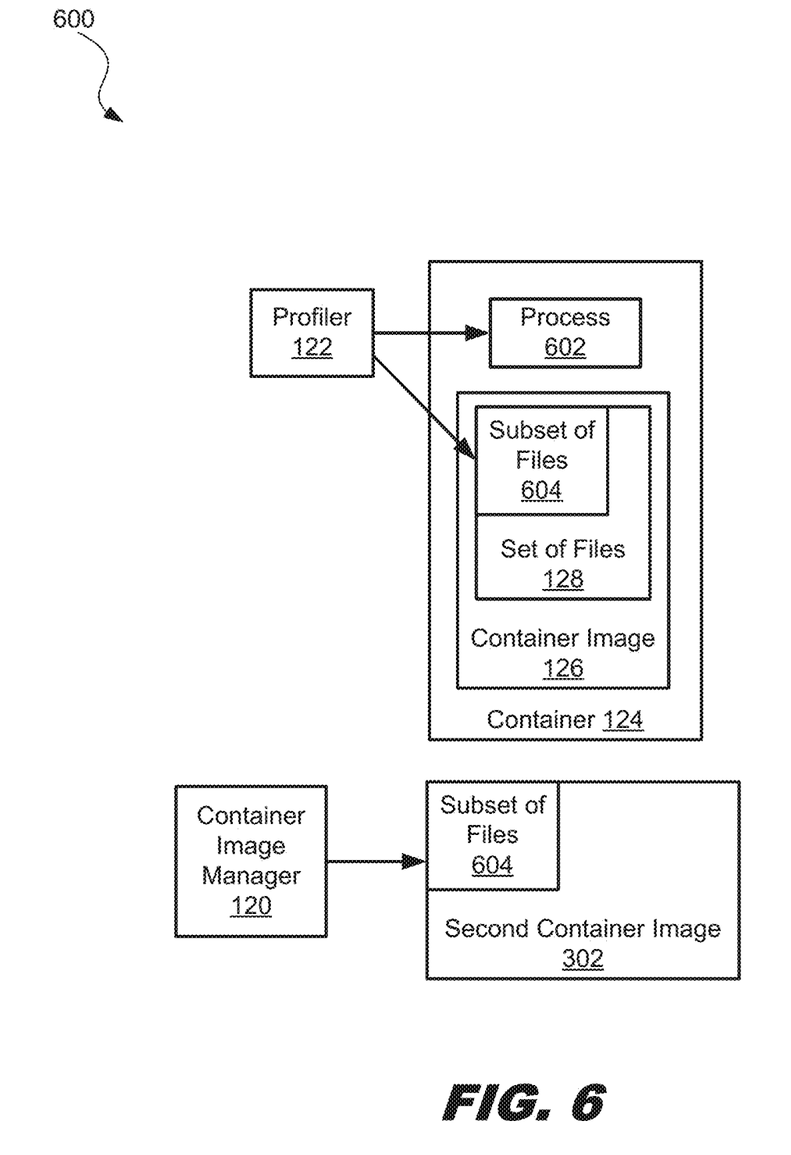
FIG. 6 is a block diagram illustrating an example system for reducing a container image size.

FIG. 6 is a block diagram illustrating an example system 600 for reducing a container image size. In FIG. 6, profiler 122 traces an execution of a process 602 running in container 124, which is associated with container image 126. Profiler 122 marks, based on the tracing, a subset of files 604 accessed by process 602. Container image 126 stores set of files 128, which includes subset of files 604.

Container image manager 120 creates second container image 302 storing the marked set of files 604. Second container image 302 may include other files aside from subset of files 604 in second container image 302. For example, container image manager 120 may add one or more files specified in a whitelist to second container image 302, where at least one of the added files was not accessed by the process. Additionally, container image manager 120 may modify second container image 302 by removing one or more files specified in a blacklist from second container image 302, where at least one of the removed files was accessed by the process. Additionally, second container image 302 may include image layers that are beneath the top-level layer of container image 126. Profiler 122 and container image manager 120 may perform these actions for one or more image layers included in a container image. Additionally, second container image 302 may be deployed to run in the same container 124 or a different container.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks, steps, or actions described herein may be changed, combined into composite blocks, steps, or composite actions, and/or separated into sub-blocks, sub-steps, or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of reducing a container image size, comprising:
    tracing an execution of a process running in a container, the container being associated with a first container image storing a set of files;
    marking, based on the tracing, a subset of files accessed by the process; and
    creating a second container image storing the marked set of files.

2. The method of claim 1, further comprising:
    tracing an execution of one or more child processes of the process running in the container; and
    marking, based on the tracing, one or more files accessed by the one or more child processes.

3. The method of claim 1, wherein a size of the first container image is larger than a size of the second container image.

4. The method of claim 1, wherein tracing the execution includes identifying one or more files opened by the process at runtime.

5. The method of claim 1, wherein the first container image includes a stack of one or more image layers, and tracing the execution includes identifying a first file that is accessed by the process, the method further comprising:
    determining whether the first file is from an image layer that is shared with at least two container images, wherein marking the subset includes in response to a determination that the first file is not from an image layer that is shared with at least two container images, marking the first file.

6. The method of claim 5, wherein if the first file is from an image layer that is shared with at least two container images, the first file is not marked.

7. The method of claim 1, wherein the first container image includes a stack of one or more image layers, and tracing the execution includes identifying a first file that is accessed by the process, the method further comprising:
    determining whether the first file is from a top-level layer of the stack, wherein marking the subset includes in response to a determination that the first file is from the top-level layer of the stack, marking the first file.

8. The method of claim 7, wherein the top-level layer is a read/write layer, and each image layer below the top-level layer is a read-only layer.

9. The method of claim 8, wherein the top-level layer is specified by a user as being the top-level layer of the stack.

10. The method of claim 1, wherein creating the second container image includes creating the second container image storing a list of files specified in a whitelist, and wherein at least one file specified in the whitelist is not accessed by the process at runtime.

11. The method of claim 10, wherein the at least one file is specified by a user.

12. The method of claim 1, wherein the container runs on a host, and wherein tracing the execution includes modifying an initial entry point of the container and adding a new mount point from a path of the host, the new mount point hosting the one or more binary files, and the one or more binary files launching the process and tracing the execution of the process running in the container.

13. The method of claim 1, wherein tracing the execution includes tracing the execution of the process at runtime, and wherein marking the subset of files includes marking the subset of files accessed by the process at runtime.

14. A system for reducing a container image size, comprising:
    a profiler that traces, by a processor, an execution of a process running in a container, wherein the container is associated with a first container image storing a set of files, and wherein the profiler marks, based on the tracing, a subset of files accessed by the process; and
    a container image manager that creates a second container image storing the marked set of files.

15. The system of claim 14, wherein the second container image is devoid of files that have not been marked.

16. The system of claim 14, wherein the container runs on a host, the system further comprising:
    a configuration manager that modifies an initial configuration of the container by modifying an initial entry point of the container and adding a new mount point from a path of the host, wherein the new mount point hosts the one or more binary files, and the one or more binary files launch the process and trace the execution of the process running in the container.

17. The system of claim 14, wherein the profiler traces the execution of the process at runtime and marks the subset of files accessed by the process at runtime.

18. The system of claim 14, wherein the container image manager adds one or more files specified in a whitelist to the second container image, and at least one file specified in the whitelist is not accessed by the process at runtime.

19. The system of claim 14, wherein the container image manager removes one or more files specified in a blacklist from the second container image, and at least one file specified in the blacklist is accessed by the process at runtime.

20. A machine-readable medium comprising a plurality of machine-readable instructions that when executed by one or more processors is adapted to cause the one or more processors to perform a method comprising:
- tracing an execution of a process running in a container, the container being associated with a first container image storing a set of files;
- marking, based on the tracing, a subset of files accessed by the process; and
- creating a second container image storing the marked set of files.

* * * * *